United States Patent
Hashisaka et al.

(10) Patent No.: US 6,645,540 B2
(45) Date of Patent: *Nov. 11, 2003

(54) METHOD FOR REDUCING COLOR MIGRATION IN MULTI-LAYERED, CARAMEL COLORED, GEL-BASED DESSERT PRODUCTS AND THE PRODUCTS SO PRODUCED

(75) Inventors: Ann E. A. Hashisaka, Anaheim, CA (US); Virender Sethi, Anaheim, CA (US); Amy Lammert, Monrovia, CA (US); Mario Mikula, Mission Viejo, CA (US)

(73) Assignee: ConAgra Grocery Products Company, Irvine, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 09/963,998

(22) Filed: Sep. 25, 2001

(65) Prior Publication Data

US 2002/0034564 A1 Mar. 21, 2002

Related U.S. Application Data

(63) Continuation of application No. 09/296,706, filed on Apr. 21, 1999, now Pat. No. 6,294,213.

(51) Int. Cl.$^7$ ............................. A23L 1/27; A23L 1/275; A23L 1/187
(52) U.S. Cl. ......................... 426/249; 426/103; 426/250; 426/573; 426/579; 426/583; 426/540; 426/578
(58) Field of Search ..................... 426/103, 89, 249, 426/250, 540, 573–579, 583

(56) References Cited

U.S. PATENT DOCUMENTS

| | | | |
|---|---|---|---|
| 2,484,543 A | 10/1949 | Baldwin et al. | 99/139 |
| 2,533,221 A | 12/1950 | Cleland et al. | 99/148 |
| 2,651,576 A | 9/1953 | Longnecker et al. | 99/148 |
| 2,841,499 A | 7/1958 | Grossi | 99/148 |
| 2,932,572 A | 4/1960 | Sarich | 426/1 |
| 3,111,411 A | 11/1963 | Livingston | 99/148 |
| 3,249,444 A | 5/1966 | Bollenback et al. | 99/148 |
| 3,336,141 A | 8/1967 | Frisina | 99/148 |
| 3,579,355 A | 5/1971 | Wyss et al. | 99/130 |
| 3,582,358 A | 6/1971 | Bundus | 99/128 |
| 3,615,591 A | 10/1971 | Newlin et al. | 99/128 |
| 3,615,592 A | 10/1971 | Peterson | 99/134 |
| 3,618,588 A | 11/1971 | Anwar et al. | 99/148 |
| 3,702,254 A | 11/1972 | Cassanelli et al. | 99/139 |
| 3,734,745 A | 5/1973 | Cassanelli et al. | 426/540 |
| 3,860,728 A | 1/1975 | Tanner et al. | 426/108 |
| 3,924,016 A | 12/1975 | Walters et al. | 426/540 |
| 3,937,851 A | 2/1976 | Bellanca et al. | 426/540 |
| 3,969,514 A | 7/1976 | Tiemstra | 426/90 |
| 3,969,536 A * | 7/1976 | Ikeda et al. | 426/103 |
| 4,113,505 A | 9/1978 | Bellanca et al. | 106/124.1 |
| 4,138,271 A | 2/1979 | Ohira et al. | 127/34 |
| 4,167,422 A | 9/1979 | Bellanca et al. | 106/402 |
| 4,304,792 A | 12/1981 | Sreenivasan et al. | 426/250 |
| 4,316,917 A | 2/1982 | Antoshkiw et al. | 426/540 |
| 4,325,743 A | 4/1982 | Tibbetts et al. | 127/46.2 |
| 4,414,234 A | 11/1983 | Sreenivasan et al. | 426/540 |
| 4,560,564 A | 12/1985 | Bruno, et al. | 426/250 |
| 4,568,553 A | 2/1986 | Murray et al. | 426/548 |
| 4,614,662 A | 9/1986 | Ramaswamy | 426/540 |
| 4,717,571 A | 1/1988 | Okonogi et al. | 426/104 |
| 4,744,991 A | 5/1988 | Serpelloni | 426/5 |
| 4,753,766 A | 6/1988 | Pinsolle | 264/174.1 |
| 4,758,444 A | 7/1988 | Terauchi et al. | 426/593 |
| 4,759,936 A | 7/1988 | Best et al. | 426/250 |
| 4,869,917 A | 9/1989 | Cunningham et al. | 426/576 |
| 4,915,971 A | 4/1990 | Fennema et al. | 426/578 |
| 5,019,405 A | 5/1991 | Sapers | 426/250 |
| 5,114,492 A | 5/1992 | Wolf et al. | 127/42 |
| 5,151,293 A | 9/1992 | Vassiliou | 426/614 |
| 5,171,603 A | 12/1992 | Singer et al. | 426/572 |
| 5,192,566 A | 3/1993 | Cox et al. | 428/89 |
| 5,202,137 A | 4/1993 | Duffy et al. | 426/89 |
| 5,227,189 A | 7/1993 | Vassiliou | 426/614 |
| 5,338,554 A | 8/1994 | Vogt et al. | 426/45 |
| 5,387,427 A | 2/1995 | Lawrence et al. | 426/573 |
| 5,417,990 A | 5/1995 | Soedjak et al. | 426/89 |
| 5,633,031 A | 5/1997 | Zablocki et al. | 426/590 |
| 6,235,320 B1 | 5/2001 | Daravingas et al. | 426/34 |
| 6,294,213 B1 * | 9/2001 | Hashisaka et al. | 426/249 |

FOREIGN PATENT DOCUMENTS

EP 686 354 B1 9/1999

OTHER PUBLICATIONS

Sethi, V., et al., "Cocoa Powder for Use in Multi–Layered Gel–Based Dessert Products and Method of Making Same", Copy of U.S. patent application No. 09/669,260; filed Sep. 25, 2000; 19 pages, (Docket No. C944:43602).

Hashisaka, A., et al., "Method for Reducing Color Migration in Multi–Layered and Colored Gel–Based Dessert Products and the Products so Produced", Copy of U.S. patent application No. 09/269,694; filed Apr. 21, 1999, (Docket No. C944:43603), 12 pages.

(List continued on next page.)

*Primary Examiner*—Milton I. Cano
*Assistant Examiner*—Robert Madsen
(74) *Attorney, Agent, or Firm*—Bingham McCutchen LLP

(57) ABSTRACT

Disclosed is a multi-layered, gel-based dessert product, such as a pudding product, formed of a gel-based layer containing a first colorant and an adjacent gel-based layer containing a second, different colorant, at least one of the colorants being a negatively charged caramel colorant. The dessert product is made by introducing gel-based dessert product containing the first colorant into the bottom of a transparent container to form a first layer and then introducing additional gel-based product containing the container to form a second layer on top to the first. The resulting multi-layer product exhibits reduced color migration between the two layers.

19 Claims, No Drawings

OTHER PUBLICATIONS

Copy of Amendment filed Aug. 30, 2001, in response to Office action dated May 29, 2001, Hashisaka, A., et al., "Method for Reducing Color Migration in Multi–Layered and Colored Gel–Based Dessert Products and the Products so Produced", U.S. patent application No. 09/269,694; filed Apr. 21, 1999; (Docket No. C944:43603), 6 pages.

Copy of Preliminary Amendment filed Apr. 3, 2001, Hashisaka, A., et al., "Method for Reducing Color Migration in Multi–Layered and Colored Gel–Based Dessert Products and the Products So Produced", U.S. patent application No. 09/269,694; filed Apr. 21, 1999; (Docket No. C944:43603), 7 pages.

Copy of Response After Final Action filed Nov. 13, 2000, in response to Office action dated Sep. 12, 2000, Hashisaka, A., et al., "Method for Reducing Color Migration in Multi–Layered and Colored Gel–Based Dessert Products and the Products So Produced", U.S. patent application No. 09/269,694; filed Apr. 21, 1999; (Docket No. C944:43603). 6 pages.

Copy of Amendment filed Jun. 16, 2000, in response to Office action dated Feb. 16, 2000, Hashisaka, A., et al., "Method for Reducing Color Migration in Multi–Layered and Colored Gel–Based Dessert Products and the Products So Produced", U.S. patent application No. 09/269,694; filed Apr. 21, 1999; (Docket No. C944:43603), 6 pages.

Williamson, D.D., "The Basics of Caramel Colors," Apr. 17, 1999; pp. 1–9.

Williamson, D.D., "Caramel Color, A Love Story," pp. 1–20.

Kuntz, Lynn A., Editor, "Food Product Design," Mar. 1998; Applications: Colors Au Naturel; pp. 60–74.

Food Technology; Products & Technologies—Ingredients; Jun. 1998, vol. 52, No. 6, pp. 70–82.

Warner•Jenkinson, Brochure: "What is Beta Carotene?"; pp. 1–3.

Food Product Design, "Acid–Stable Natural Colors Offer Opportunities for Formulations," Jun. 1998, p. 145.

\* cited by examiner

METHOD FOR REDUCING COLOR MIGRATION IN MULTI-LAYERED, CARAMEL COLORED, GEL-BASED DESSERT PRODUCTS AND THE PRODUCTS SO PRODUCED

CROSS-REFERENCE TO RELATED APPLICATIONS

This application is a continuation of patent application Ser. No. 09/296,706, filed Apr. 21, 1999, now U.S. Pat. No. 6,294,213B1.

BACKGROUND OF THE INVENTION

1. Field of the Invention

This invention relates to the food-making arts. In particular, it relates to a method for making gel-based dessert products, such as puddings, and the products so produced.

2. Discussion of the Related Art

Consumers regularly eat pudding and other gel-based dessert products, some of which are non-dairy based. Consumers' desire for convenient foods led to the development of such items that require little or no advance preparation by the consumer before eating. Beginning approximately 30 years ago, consumers were offered these types of products in ready-to-eat, single-serve, portable containers. Initially these products were sold as shelf-stable, canned products. These canned products, such as pudding, were subjected to retort processing and did not as closely approximate the later developed aseptically packaged puddings.

As consumers begin to have more choices with regard to wholesome, nutritious snacks, manufacturers have developed new markets and innovated to remain competitive in this area. A new market for milk-based pudding and other dessert gels is the entry into the refrigerated section of the supermarket. One of the innovations has been the packaging changeover from opaque plastic to clear plastic cups, allowing the consumer to see that which is being purchased. Industry's move to clear plastic cups has engendered other innovations, such as the layering of different flavor puddings or other gelled desserts into the same cup or container. These improvements also are being used with shelf-stable puddings and gel-based desserts that are stored at room temperature for long periods of time.

The color of a food or beverage is one of the first attributes recognized by the senses of the purchaser and intended consumer of the product. Typically, when a manufacturer makes pudding, or other dessert product which has more than one flavor layer, the manufacturer colors the layers differently to make the product more attractive and commercially appealing. Current manufacturing methods have concentrated on using oil or water dispersed lake colorants to produce the desired colors. For example, manufacturers have tried to produce pudding products having a top layer that is red, yellow, or brown color in color next to a bottom layer that is a contrasting color, such as yellow or white.

Color migration can be defined as the mobility of a colorant in a pudding formulation into an adjacent layer of pudding, that was not intended to be in, that results in the lightening or darkening otherwise distorting of the adjacent layer(s) during the shelf life of the pudding product. In a single flavor/color pudding cup, the migration of color has not been an issue. However, in a multi-layered pudding cup, the migration of the color changes the appearance of the product from what it was intended to be, which results in the product not appearing as it was originally designed to appear to the consumers, and thus having a decreased consumer acceptance. For example, when the top layer is a dark brown color and the bottom layer is a lighter caramel color, the lighter caramel color migrates from the bottom layer up into the upper darker caramel layer causing it to lighten, the darker caramel color migrates down into the bottom layer causing it to darken, or both.

Caramel colorants can be used to provide a wide range of familiar and pleasantly appearing colors in foods, ranging from light yellows through reddish-browns to dark browns. The specific color depends on which caramel colorant is selected, and in what amount. Caramel colorants are amorphous, brown to brownish materials resulting from the carefully controlled heat treatment of food grade carbohydrates in the presence of small amounts of food grade acids, alkalis, or salts. There currently are only two main suppliers of caramel colorant in the U.S. food industry, Sethness and D. D. Williamson.

Caramel colorants are used most commonly in carbonated soft drinks and beverages, particularly colas, but they also are used in many other segments of the food industry, including baked goods, microwaveable entrees, and pudding products. Caramel colorants are exceptionally stable colorant agents, tolerant of a wide range of physical and chemical environments found in food. For example, caramel colorant has good functionality across a wide range of pH from 2 to 10. Most desserts are in the pH range of 3 to 7.

Each caramel molecule carries an electrical charge formed during processing and caramel colorants carry either a positive or negative in ionic charge, depending in part on processing conditions. The International Technical Caramel Association has classified four caramel colorants based on the catalysts (if any) used in the reaction. Class I caramels are caramels in which no catalysts are used. Class I caramels have a slightly negative charge. Class II caramels are produced in sulfite catalyzed reactions, also have a negative charge. Class III caramels are produced in ammonia catalyzed reactions and have a positive charge. Lastly, Class IV caramels are produced in an ammonia and sulfite catalyzed reaction and have a negative charge. In commercially-produced milk-based puddings, positively charged caramel colorant particles often have been used because of the problem of agglomeration of the dairy particles with negatively charged colorant particles.

There has existed a definite need for a method for preparing multi-layered, gel-based dessert products containing at least one caramel colored layer that exhibits reduced migration into the adjacent layer(s). This present invention satisfies these and other needs.

SUMMARY OF THE INVENTION

Now in accordance with the invention, there has been found a method for reducing color migration in multi-layered, gel-based dessert products containing at least one caramel colored layer. Representative products include pudding products, yogurt products, and non-milk gel-based dessert products. The products contain a layer containing a first colorant and an adjacent layer containing a second, different colorant. At least one of the colorants is a negatively charged caramel colorant. In preferred embodiments, the negatively charged caramel colorant has a weight average molecular weight in the size range from about 100,000 to about 1,000,000 Daltons. In most preferred embodiments, the negatively charged caramel colorant has a weight average molecular weight in the size range from about 200,000 to about 650,000 Daltons. Also in most preferred embodiments, the negatively charged caramel colorant is a Class IV colorant. Preferred negatively charged caramel colorant include Sethness RT240 or Sethness DS400, or D. D. Williamson 108, 111, or 050 caramel colorants. In some embodiments, two adjacent layers contain negatively charged caramel colorants, but each colorant has a different negative charge.

The multi-layered gel-based dessert products are made by introducing a gel-based dessert product containing the first colorant into the bottom of a transparent container to form a first layer and then introducing additional gel-based product containing the second colorant into the container to form a second layer on top to the first. The resulting multi-layer product exhibits reduced color migration between the two layers.

DETAILED DESCRIPTION OF THE PREFERRED EMBODIMENTS

To exemplify the product and process in accordance with the invention, the following description concentrates primarily of a multi-layered pudding product and a method for making the multi-layered product. It should be readily apparent to the skilled artisan that the description with little modification, might also apply to the preparation of other gel-based dessert products including both other milk-based gel products, such as yogurt, as well as their non-dairy counterparts.

The pudding made in accordance with this invention has at least two adjacent layers. Each pudding layer is prepared from conventional pudding ingredients, typically including nonfat milk, water, a sweetener, an emulsified fat and/or oil, a thickener, particularly a starch thickener, and at least on emulsifier/stabilizer. Additional ingredients include non-fat milk solids, pieces of fruit, salt, colorants, and flavorants. A typical pudding formulation is given in the table below. Certain ingredients may not be present in certain types of pudding such as the intentional absence of fat or oil in "fat free" pudding. Similarly, not all gel desserts (i.e., "non-dairy") need contain milk products.

| Ingredient | Acceptable Range (% weight) | Preferred Range (% weight) |
| --- | --- | --- |
| Nonfat Milk | 30.0–70 | 35.0–45 |
| Water | 5.00–20 | 10.0–15 |
| Sweetener | 0.05–30 | 0.50–25 |
| Fat | 0.50–15 | 0.50–10 |
| Thickener | 2.00–10 | 3.00–8.0 |
| Salt | 0.05–2.0 | 0.75–1.25 |
| Emulsifier/Stabilizer | 0.01–2.0 | 0.05–1.50 |
| Colorants | 0.01–2.0 | 0.02–1.25 |
| Flavorants | 0.05–2.0 | 0.10–1.50 |

The pudding layers are typically made with from about 30 to about 70 wt. %, preferably from about 35 to about 45 wt. % skim milk and/or non-fat milk and from about 5 to about 20 wt. %, preferably from about 10 to about 15 wt. % water. For those puddings which contain a low level of fat, low-fat or whole milk may also be used as ingredients. Tthroughout the specification and claims, weight percentages are based on the total weight of the ingredients used to make the pudding layer.

The sweetener component employed in formulating the pudding layers of the present invention is chosen to provide a desired degree of sweetness and solids to the final pudding product. Sucrose is the preferred sweetener component. Generally, sucrose is used in an amount from about 0.05 to about 30 wt. %, preferably from about 0.5 to about 25 wt. %. Other suitable sweeteners that can be employed as all or a portion of the sweetener component include other sweet mono-, di- or polysaccharides, such as dextrose, fructose, corn syrups, corn syrup solids, high fructose corn syrups, and the like. Nutritive and non-nutritive, intensive sweeteners such as saccharin, aspartame, Sucralose™, Acesulfame K™ and the like may also be employed as all or part of the sweetener component. The use of intensive sweeteners may be accompanied by use of suitable sweet or non-sweet bulking agents to provide a desired solids level; however, bulking agents will typically not be needed. All of theses components are to be included in the term "sweetener" as employed in this invention; provided, however, that in the case of syrups, only the solids portion is included as a sweetener.

Any suitable thickening agent can be employed to provide the desired firmness or texture. In preferred embodiments, the thickening agent is a starch, including corn starch, potato starch, tapioca starch, rye flour, wheat flour, and the like, modified or unmodified. In most preferred embodiments the thickening agent is a combination of modified corn and modified waxy corn starches. Typically, the starch is present in an amount from about 2 to about 10 wt. %, preferably from about 3 to about 8 wt. %.

Fat emulsions are usually incorporated in the pudding composition to improve the textual quality and mouthfeel of the pudding. The fat emulsion usually contains a vegetable fat, such as a partially hydrolyzed vegetable oil, in an amount from about 0.5 to about 15 wt. %, preferably from about 0.5 to about 10 wt. %.

The pudding composition of the present invention also contains at least one emulsifier/stabilizer component which aids in dispersing and mixing of ingredients and contributes to the desired firm, smooth texture. A preferred emulsifier/stabilizer is sodium stearoyl-2-lactylate. Other suitable emulsifier/stabilizer ingredients include mixtures of mono- and di-glycerides prepared by direct esterfication of edible fatty acids and glycerine, propylene glycol esters of fatty acids, and lecithin. Protein stabilizers, such as disodium phosphate are also useful in accordance with the invention. The emulsifier/stabilizer(s) is generally present in an amount from about 0.01 to about 2 wt. %, preferably from about 0.05 to about 1.5 wt. %.

At least one of the pudding layers contains a negatively charged caramel colorant. The greater the negative charge, the less the migration of the colorant in the final pudding layer. Furthermore, the greater the weight average molecular weight of the negatively charged caramel colorant, the less the migration the colorant and in preferred embodiments the negatively charged caramel colorant has a weight average molecular weight in the range from about 100,000 to about 1,000,000 Daltons, and more preferably in the range from about 200,000 to about 650,000 Daltons. The caramel colorants of Class IV typically have a greater negative charge and a higher weight average molecular weight than the caramel colorants of Classes I–III. Therefore, the caramel colorants of Class IV are generally preferred. The most preferred caramel colorants are Sethness RT240 or or Sethness DS400, or D. D. Williamson 108, 111, or 050.

The amount of the negatively charged caramel colorant depends on the particular color desired and the particular colorant chosen. The amount to be used in a formulation for a particular pudding layer will readily be determinable by one skilled in the art without undue experimentation. Typically the amount of negatively charged caramel colorant is from about 0.01 to about 2 wt. %, preferably from about 0.02 to about 1.25 wt. %.

The formulation used for both pudding layers can also contain conventional pudding ingredients such as salt, typically in an amount from about 0.05 to about 2 wt. %, preferably from about 0.75 to about 1.25 wt. %, and flavorants, as for example vanilla, strawberry, cocoa, caramel, and the like. The flavorants can be used in the pudding composition at any desired concentration depending upon the particular flavoring desired. Typically, the flavorants are present in an amount from about 0.05 to about 2 wt. %, preferably from about 0.1 to about 1.5 wt. %. Other ingredients that can be included in one or both of the pudding layers include non-fat milk solids and pieces of fruit.

According to one method for preparing the multi-layer pudding in accordance with the invention, a bottom pudding the layer is prepared first by combining the liquid ingredients, including a portion of the water having a temperature of between about 150° F. and about 180° F., preferably about 170° F.; with from about 30 to about 70 wt. %, preferably from about 35 to about 45 wt. % heated skim milk and/or non-fat milk; from about 0.5 to about 15 wt. %, preferably from about 0.5 to about 10 wt. %. vegetable oil; and from about 0.01 to about 2 wt. %, preferably from about 0.05 to about 1.5 wt. %. emulsifier/stabilizer(s). If the bottom layer is to contain a caramel colorant, from about 0.01 to about 2 wt. %, preferably from about 0.02 to about 1.25 wt. % colorant can be added at this time. Alternatively, the caramel colorant can be added at any time during the process, up until the ingredients are cooked and the gel is formed. If the bottom layer is to contain a colorant other than a caramel colorant or in addition to the caramel colorant, it can be combined with the other liquid ingredients or added subsequently.

The liquid ingredients are then mixed to effect thorough and complete dispersion, such as by homogenization. Typically, the liquid ingredients are charged into a single or multiple-stage homogenizers at an elevated temperature. The mixture is then passed through the homogenizer at a sufficient temperature and pressure to form a homogenized base.

To the homogenized base are added the remaining ingredients including from about 2 to about 10 wt. %, preferably from about 3 to about 8 wt. %. starch, added as a slurry using the remaining portion of water (the total amount of water added in both portions is from about 5 to about 20 wt. %, preferably from about 10 to about 15 wt. %); and other dry ingredients, such as salt in an amount from about 0.05 to about 2 wt. %, preferably from about 0.75 to about 1.25 wt. %, and flavorants, in an amount from about 0.05 to about 2 wt. %, preferably from about 0.1 to about 1.5 wt. %. If the colorants were not incorporated into the homogenized base, they can be added at this time.

These remaining ingredients are added to the homogenized base using a relatively high level of agitation. An induction mixer is one type of device for providing the desired agitation. After thorough mixing, the mixture is thermally processed, for example in a tube or a scraped-surface heat exchange apparatus so as to best accommodate the increasing viscosity of the mixture during heating. The pudding mixture then is heated to a sufficient temperature for the necessary time required to effect cooking and microbial kill.

In commercial operations it may be desirable to provide a hold tank between the mixing step and the cooking step in order to serve as a buffer against process disruptions. If such a tank is present, the tank should keep the pudding temperature at about 40° F. to retard microbiological growth.

The resulting pudding is cooled to a temperature suitable for filling into a transparent container, such as a transparent cup. Cooling may be effected using either direct or indirect heat with a scraped-surface heat exchanger being typical for indirect heating and steam injection being a typical procedure for applying direct heat. The cooling step should be done while the mix is being subjected to shear conditions. Cooling may be accomplished using plate, tubular and/or scraped-surface heat exchangers. The cooled pudding is then introduced into the cup to form the first layer at a temperature below 140° F., preferably about 90° F.

A similar process is used to prepare a second pudding layer having a different color. After cooling to a suitable temperature for filling, the second pudding is introduced into the transparent plastic cup to form a second layer on top of the first. The process can be repeated as many times as desired to form three or more different layers. The third layer, for example, can be made from a third pudding formulation or it can be made from the material used to form the bottom layer. In some embodiments, the pudding has two adjacent layers, each with a negatively charged caramel colorant caramel colorant, but the two caramel colorants have different negative ionic charges.

After the transparent cup is filled it is sealed, for example, with an adhesively applied foil lid. If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials, i.e., the transparent container and foil lid. These steps would also be desirable to reduce microbial activity even in the event that a true aseptic process is not being sought, such as when the pudding is placed in a refrigerated distribution system and sterility is not required but extended storage life is desirable.

While the invention has been described in detail with reference to certain preferred embodiments thereof, it will be understood that modifications and variations are within the spirit and scope of that which is described and claimed.

We claim:

1. A method for reducing color migration in a gel-based dessert product comprising:
   introducing a first gel-based dessert product containing a negatively-charged caramel colorant into a container;
   prior to or after introduction of the first gel-based dessert product, introducing a second gel-based dessert product into the container so that the second gel-based dessert product is adjacent the first gel-based dessert product.

2. The method of claim 1, wherein the caramel colorant has a weight average molecular weight ranging from about 100,000 to about 1,000,000 Daltons.

3. The method of claim 1, wherein the caramel colorant has a weight average molecular weight ranging from about 200,000 to about 650,000 Daltons.

4. The method of claim 1, wherein the caramel colorant is a Class IV colorant.

5. The method of claim 4, wherein the caramel colorant has a weight average molecular weight ranging from about 100,000 to about 1,000,000 Daltons.

6. The method of claim 4, wherein the caramel colorant has a weight average molecular weight ranging from about 200,000 to about 650,000 Daltons.

7. A The method of claim 1, wherein the caramel colorant is a Class I colorant.

8. The method of claim 1, wherein the caramel colorant is a Class II colorant.

9. The method of claim 1, wherein the container comprises a transparent material.

10. The method of claim 1 wherein the dessert product is a pudding product.

11. The method of claim 1 wherein the dessert product is a yogurt product.

12. The method of claim 1 wherein the product is a non-milk gel-based dessert product.

13. The method of claim 1, wherein the second gel-based dessert product contains a colorant that is different from the colorant in the first gel-based dessert product.

14. The method of claim 13, wherein the colorant in the second gel-based dessert product is a negatively charged caramel colorant having a charge different from the charge of the negatively charged caramel colorant in the first gel-based dessert product.

15. The method of claim 1, wherein the first gel-based dessert product and second gel-based dessert product are introduced into the container so that one of the first and second gel-based dessert products is on top of the other of the gel-based dessert products.

16. A method for reducing color migration in a gel-based dessert product comprising:

introducing a first gel-based dessert product containing a first colorant into the bottom of a container;

thereafter introducing a second gel-based dessert product containing a colorant into the container so that the second gel-based dessert product is on top of the first gel-based dessert product;

wherein at least one of the first and second colorants comprises a negatively-charged caramel colorant.

17. The method of claim 16, wherein the caramel colorant has a weight average molecular weight ranging from about 100,000 to about 1,000,000 Daltons.

18. The method of claim 16, wherein the caramel colorant has a weight average molecular weight ranging from about 200,000 to about 650,000 Daltons.

19. The method of claim 16, wherein the caramel colorant is a Class IV colorant.

* * * * *